(12) United States Patent
Boss et al.

(10) Patent No.: US 7,425,903 B2
(45) Date of Patent: Sep. 16, 2008

(54) DYNAMIC VEHICLE GRID INFRASTRUCTURE TO ALLOW VEHICLES TO SENSE AND RESPOND TO TRAFFIC CONDITIONS

(75) Inventors: Gregory Jensen Boss, American Fork, UT (US); Christopher James Dawson, Arlington, VA (US); Barry Michael Graham, Silver Spring, MD (US); Rick Allen Hamilton, II, Charlottesville, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 11/380,665

(22) Filed: Apr. 28, 2006

(65) Prior Publication Data
US 2007/0252723 A1    Nov. 1, 2007

(51) Int. Cl.
*G08G 1/00* (2006.01)
(52) U.S. Cl. .......................... 340/902; 340/435; 701/96
(58) Field of Classification Search ................. 340/902, 340/901, 435, 463; 701/96, 301; 180/271
See application file for complete search history.

(56) References Cited
U.S. PATENT DOCUMENTS

| | | | | |
|---|---|---|---|---|
| 5,126,735 A | * | 6/1992 | Trevijano | 340/902 |
| 5,249,027 A | * | 9/1993 | Mathur et al. | 356/3.14 |
| 5,390,125 A | | 2/1995 | Sennott et al. | 340/449 |
| 5,589,827 A | * | 12/1996 | Scurati | 340/901 |
| 5,636,123 A | | 6/1997 | Rich et al. | 340/461 |
| 6,252,520 B1 | * | 6/2001 | Asami et al. | 340/903 |
| 6,741,168 B2 | | 5/2004 | Webb et al. | 340/436 |
| 6,765,495 B1 | * | 7/2004 | Dunning et al. | 340/903 |
| 7,102,496 B1 | * | 9/2006 | Ernst et al. | 340/436 |
| 7,304,589 B2 | * | 12/2007 | Kagawa | 340/995.13 |
| 7,315,239 B2 | * | 1/2008 | Cheng et al. | 340/436 |
| 2002/0140548 A1 | | 10/2002 | Lutter et al. | 340/425.5 |
| 2004/0246117 A1 | * | 12/2004 | Ogawa et al. | 340/445 |

* cited by examiner

*Primary Examiner*—Phung Nguyen
(74) *Attorney, Agent, or Firm*—David A. Mims, Jr.; Darcell Walker (57) ABSTRACT

A dynamic 'vehicle grid' system provides the ability for drivers to be automatically warned to the conditions of other vehicles in the vicinity. In this grid system, a motor vehicle would be equipped with a transmitter, receiver, computer and a selection of sensors. Other adjacent vehicles are also contain the same of equipment for transmitting and receiving signals. When the sensors in a vehicle detect a change such as hard braking (rapid deceleration) or very slow speed (blockages), it automatically sends this information via the transmitter over a wireless communication channel to any other receivers in the vicinity.

8 Claims, 5 Drawing Sheets

DYNAMIC VEHICLE GRID INFRASTRUCTURE TO ALLOW VEHICLES TO SENSE AND RESPOND TO TRAFFIC CONDITIONS

FIELD OF THE INVENTION

The present invention describes a system and method to create a dynamic grid infrastructure made up of multiple automobiles. This grid infrastructure allows traffic and other important information to be propagated between each of the automobiles comprising the infrastructure. The invention describes an algorithm that allows the grid infrastructure to be created and managed, as well as the details of the information that is passed between automobiles that make up the grid.

BACKGROUND OF THE INVENTION

In the current art, automobiles and other vehicles have no simple way of communicating with one another. Consider the example where a car has to suddenly brake in front of another car. The driver of the trailing vehicle perhaps sees the brakes of the car in front, cueing him or her to slow down. However, what about the car following behind the second one, or the car behind that car? Consider another example of a line of stationary cars one mile ahead of a driver. Until the driver has to slow down, there is no way for the driver to know that stationary cars are currently one mile ahead.

The present invention solves the problem of being able to allow this information (and more) to be propagates between vehicles by forming a dynamic (ad hoc) 'automobile grid'. This grid infrastructure allows vehicles to constantly be in communication with surrounding vehicles, such that important information such as speed, sudden braking, or a myriad of other conditions can instantly be relayed to nearby automobiles. It therefore solves the problem of being able to have this information instantly communicated to other vehicles in the area such that stationary traffic can be avoided and drivers can be made aware of emergency situations such as heavy braking in front.

There are solutions in place today that solve the problems of a driver being able to find out information about stationary traffic. GPS-enables navigation systems are able to have traffic information sent to them via satellite to warn drivers of stationary cars ahead. This solution however relies on having a third party detects traffic problems and sending the information to vehicles in the area via a communication channel. This method is very expensive and relies on a system that can detect traffic patterns and problems. The known solution for a driver knowing that a car in front is rapidly braking is simply by looking at the brake lights. While this method obviously works, it is difficult for an automobile 2, automobile 3 or even more cars behind to detect an emergency braking.

Another approach described in U.S. Pat. No. 6,741,168 is a device within an automobile comprises or includes a wireless communications controller which, upon detection of impact, attempts to establish a wireless communications link to each of any counterpart wireless communications controllers which are within vehicles also subject to a recent impact, and therefore presumably involved in the collision. Vehicle identification information and information collected regarding the collision, such as vehicle speed, location, direction of travel, impact direction and magnitude, point of impact, etc., are automatically exchanged between vehicles involved in the collision and may be later retrieved from either vehicle, preserving objective information for accident reconstruction by police and insurance companies.

U.S. Patent Application 20020184641 describes a communications system incorporating a plurality of vehicle mounted web cams that collect video information and transmit the video information together with other local information via a wireless network to a server. The video streams from the web cams and associated information are available to users on a Internet web page. Each camera has a specific identifier to permit users to access the video of specific individual cameras. Optimization software permits users to take virtual trips along predetermined routes. The system also permits sequential access to multiple video feeds from desired locations. Multiple alternative one way and two way video communication methods taking advantage of the network of mobile web cams are described.

Although these approaches attempt to warn other drivers of potential hazards, there is no solution in place today that can warn a driver of an emergency brake of a vehicle out of sight of the driver.

SUMMARY OF THE INVENTION

It is an object of the present invention to provide a method and system in which a motor vehicle can warn other motor vehicles in the vicinity of an event occurring with the warning vehicle.

It is a second objective of the present invention to provide a method and system in which a motor vehicle sends out a signal to other vehicles in the vicinity of an event occurring with that vehicle.

It is a third objective of the present invention to provide a method and system in which a motor vehicle that receives a signal of an event can relay that signal to other vehicles in the vicinity.

It is a fourth objective of the present invention to provide a system of sensors and transmitters that can detect an event and transmit a signal indicating that detected event.

It is a fifth objective of the present invention to provide a system within a motor vehicle that can detect an event with the vehicle, distinguish the type of event that is occurring and transmit a message to other vehicles in the vicinity indicating the type of event that is occurring.

The main idea of the invention is the creation of a dynamic 'vehicle grid' system. In this grid system, a motor vehicle would be equipped with a transmitter, receiver, computer and a selection of sensors. Other adjacent vehicles are also contain the same of equipment for transmitting and receiving signals. When the sensors in a vehicle detect a change such as hard braking (rapid deceleration) or very slow speed (blockages), it automatically sends this information via the transmitter over a wireless communication channel to any other receivers in the vicinity.

In the method of the invention, one or more sensors in a motor vehicle detect an event such as a hard breaking action. The sensors send a signal to a central computer in the vehicle. The computer determines the type of detected event and formulates a message. A transmitter then broadcasts this message out to other motor vehicles in the vicinity. Other vehicles in the vicinity detect this broadcasted signal with the receiver contained in that vehicle. This signal is then transmitted to the computer in that vehicle which processes to interpret the nature of the transmitted event. The information is then conveyed to the driver of the vehicle receiving the signal.

DETAILED DESCRIPTION OF THE INVENTION

Figure 1:
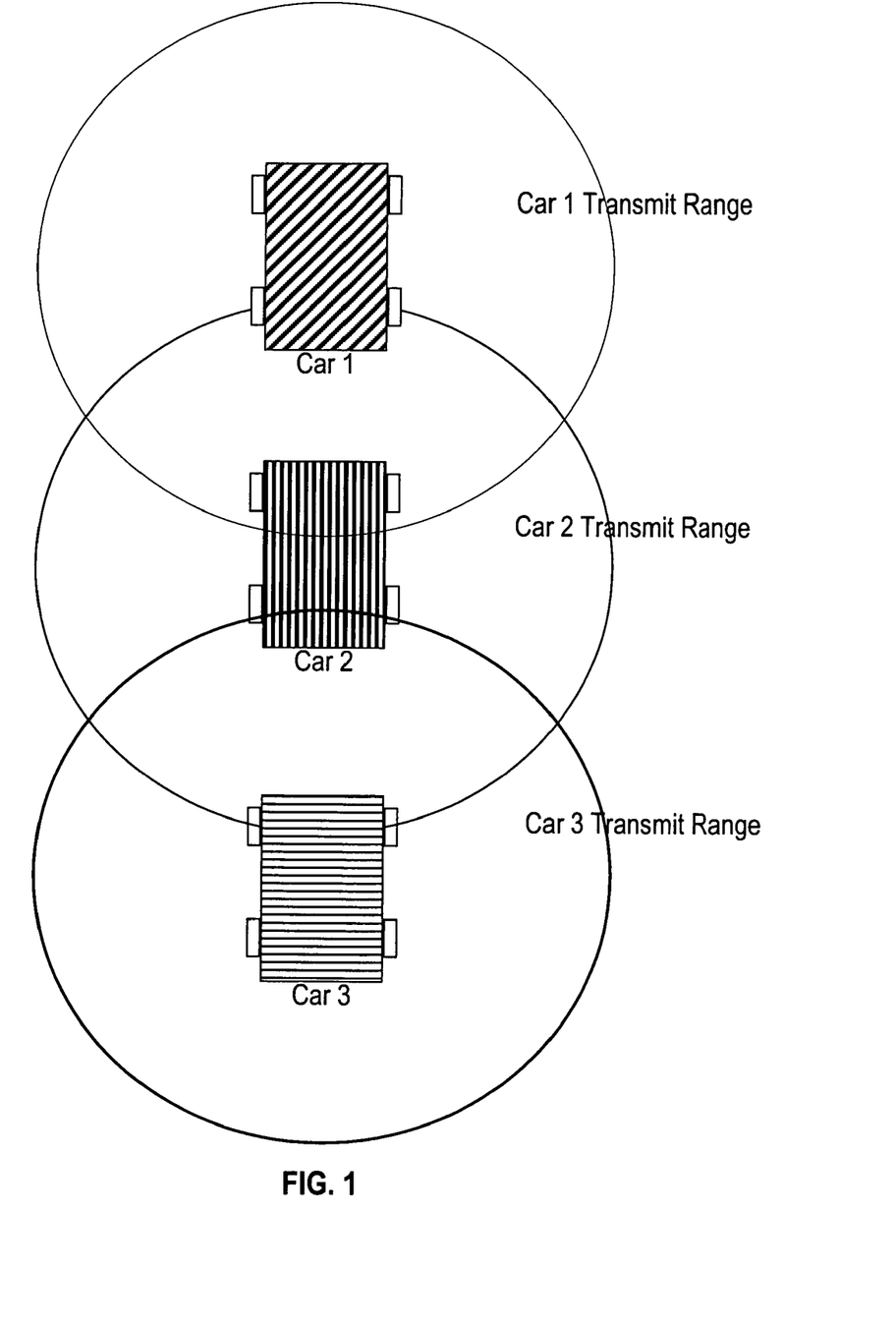
FIG. 1 shows a vehicle grid of the present invention in which three vehicles are in close proximity of each other and each vehicle has the capability to transmit to and receive signals from the other vehicles.

FIG. 1 illustrates a configuration of a vehicle traffic grid of the present invention. This grid shows three vehicles, cars 1, 2 and 3, that can be traveling on a roadway in close proximity to each other. Each vehicle has transmission range in which the vehicle can reliably transmit signals to and receive signals from other vehicles in the grid. Because of this close proximity, if a vehicle experiences an event such as a sudden turn or the steering wheel or a sudden deceleration resulting braking, signals indicating these events can be transmitted to and received at the other vehicles in the vicinity. When the driver of a vehicle receives the signal, that driver will be alerted to the event and can take responses actions if necessary. In this illustration, car number 2 has a transmission range in which it can send messages to and receive messages from cars 1 and 3.

Figure 2:
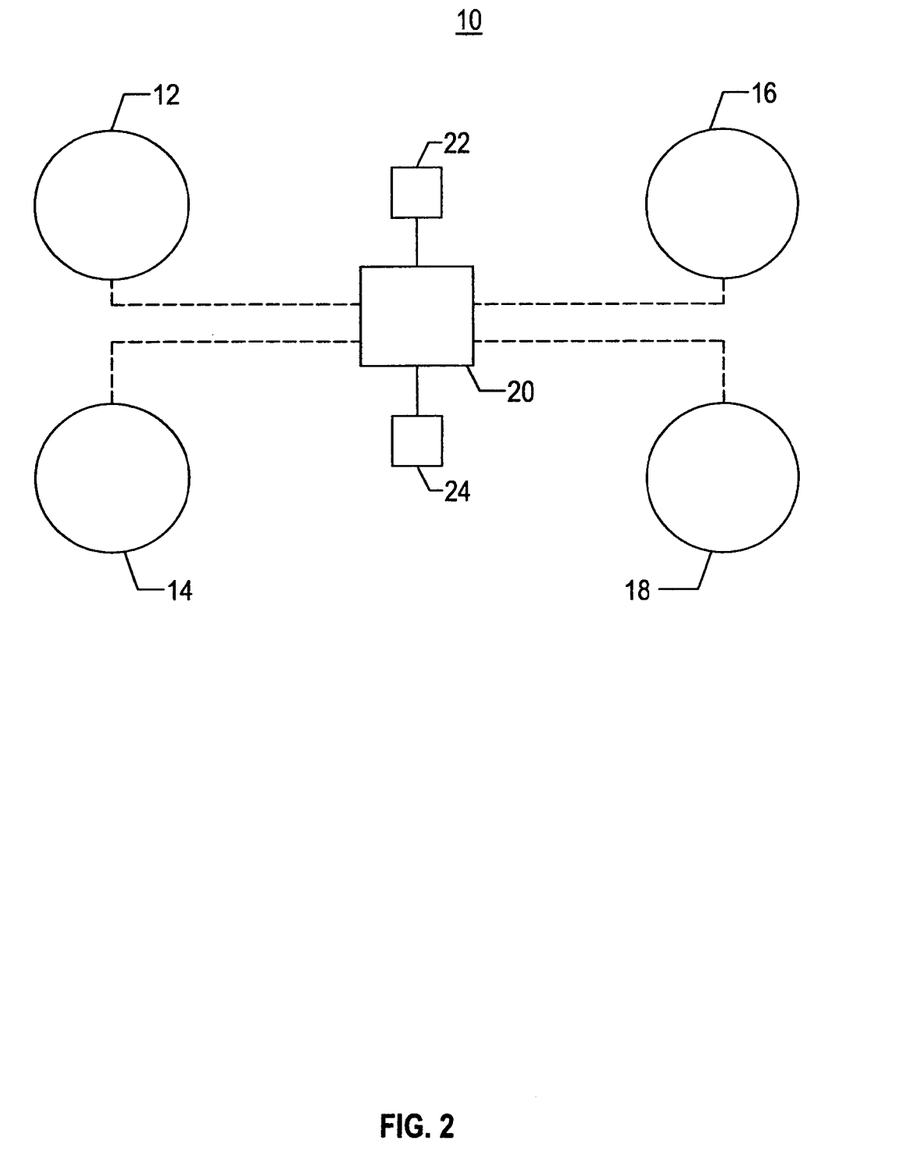
FIG. 2 is an illustration of a motor in accordance with the present invention equipped with sensors, a transmitter, a receiver and a computer.

FIG. 2 illustrates the configuration of vehicle components that are used in the implementation of the present invention. Preferably, each vehicle will contain sensors, a transmitter, a receiver and a computer. The computer will process data from the sensors for broadcast to other vehicles via the transmitter and process data from other vehicles gathered by the receiver.

The first component for each vehicle of the grid is the collection of sensors. Each vehicle may have different numbers and types of sensors. This invention is not limited to particular number of receivers or a particular type of receiver. In the vehicle there can be receivers positioned at various locations on the vehicle. Referring to the vehicle 10 of FIG. 2, sensors 12, 14, 16 and 18 are positioned at each of the four wheels of the vehicle. As mentioned, the types of sensors vary and can include sensors such as the following:

Accelerometer: This sensor detects any changes in speed of the vehicle including emergency braking or sudden swerving. The sensor can be customized or pre-installed to trigger when the amount of deceleration or sideways force reaches a threshold.

Speed Sensor: This sensor detects how long a vehicle has been stationary or moving at slow speed. This sensor can be customized to trigger if the vehicle has been stationary or less than 5 mph for more than 5 minutes, or any other time interval.

Crash Sensor: This sensor detects any deployment of an air bag or other crash system. It will trigger upon detection of a crash.

Peripheral Sensor: This sensor will detect the use of any peripheral in the vehicle—for example, windshield wipers or headlights. The sensor can be triggered upon activation of these peripherals.

The second component of a vehicle in the grid is a central computing device 20 that can analyze the sensors to determine when to transmit a piece of information via the transmitter to other vehicles within range. This analysis can involve the receipt of signals from the sensors when a sensor has detected a vehicle event. The computing device 20 processes the information received from the sensors to determine the type of event. The computing device also formulates the message that will be broadcast to other vehicles in the grid. In addition, the computing device also must be able to analyze information receive from the receiver component, interpret this information and formulate a message to convey the driver of the vehicle. This conveyance of information can be in the form a message displayed to the driver via a vehicle display of the vehicle dashboard.

The third component of a vehicle in the grid is the transmitter 22. This component functions to broadcast an event or condition of a vehicle to other vehicles in the grid. The transmitter receives the information for broadcast from the computer component. This component 22 can use a plurality of wireless technologies to transmit information as a broadcast to other vehicles in a predetermined range. The transmitter may use RF, Wireless 802.11b, cellular or other wireless technology to communicate to other vehicles. In the preferred embodiment, sundry wireless communication methods can be used in parallel to maximize the availability of the grid network.

The receiver component 24 has the capability to listen for communication messages from other vehicles and then feed these messages to the central computing device 20 for processing. As with the transmitter 22, the receiver 24 also may be implemented with a plurality of wireless technologies not limited to RF, Wireless 802.11b and cellular. In the preferred embodiment, sundry wireless communication methods can be used in parallel to maximize the availability of the grid network.

Figure 3:
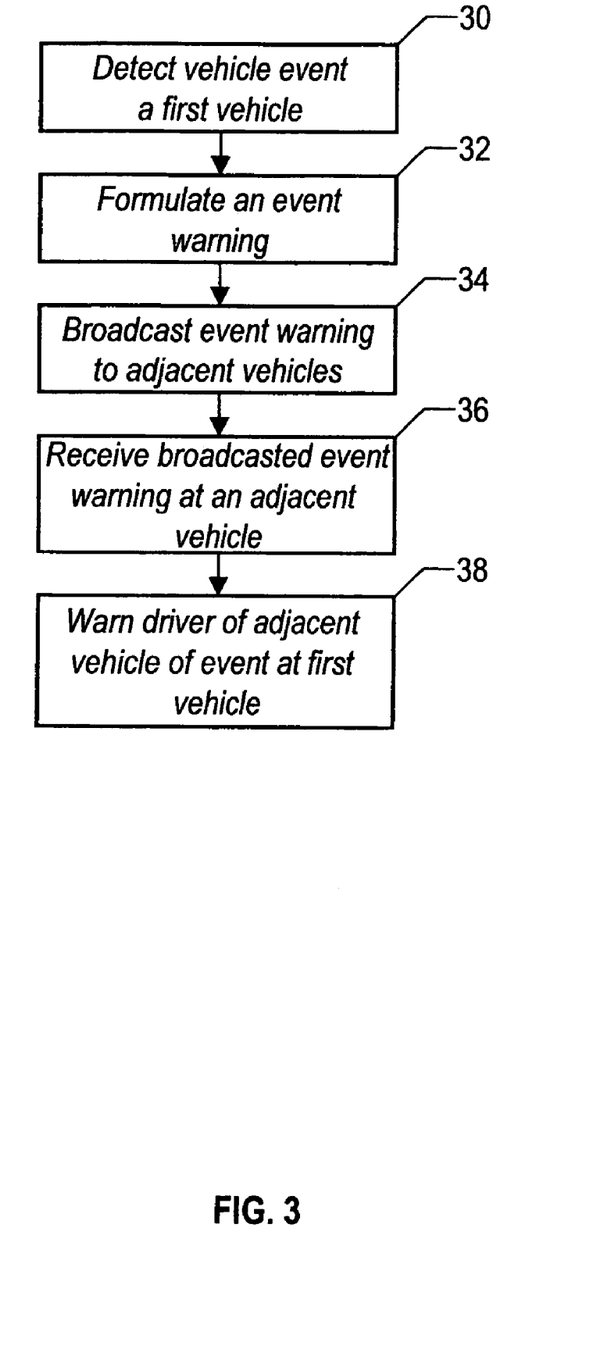
FIG. 3 is a flow diagram of the basic steps in the method of the present invention.

FIG. 3 is a flow diagram of the basic steps in the implementation of the message of the present invention. During normal driving operations of a vehicle in the grid, the sensors and computing device are in a monitor state. When an event occurs such as a braking condition, one or more sensors will detect this condition and send a signal to the computing device in step 30. In the vehicle grid configuration, the vehicle doing the braking is noted as the first vehicle. This first vehicle is the one experiencing a condition. Once this signal is sent to the computing device, in step 32, the computing device formulates a message for broadcast to other vehicles warning the other vehicles of the condition or event of the first vehicle. Step 34 broadcasts the message of the event to other vehicles in the grid. This broadcast message is sent from the computing device to the transmitter, which sends out the message to the other vehicles in the grid. The messages are transmitted and received on a predetermined communication frequency.

Step 36 is a message receiving activity that occurs at a second vehicle, which is not the vehicle the experiencing the event or transmitting the signal. In this step, the receiver of the second vehicle detects the transmitted signal of an event at a vehicle in the grid. Internally, the receiver sends the message to the computing device of that vehicle. In step 38, the computing device formulates a message of the event and conveys a warning message to the driver of the second vehicle.

Figure 4:
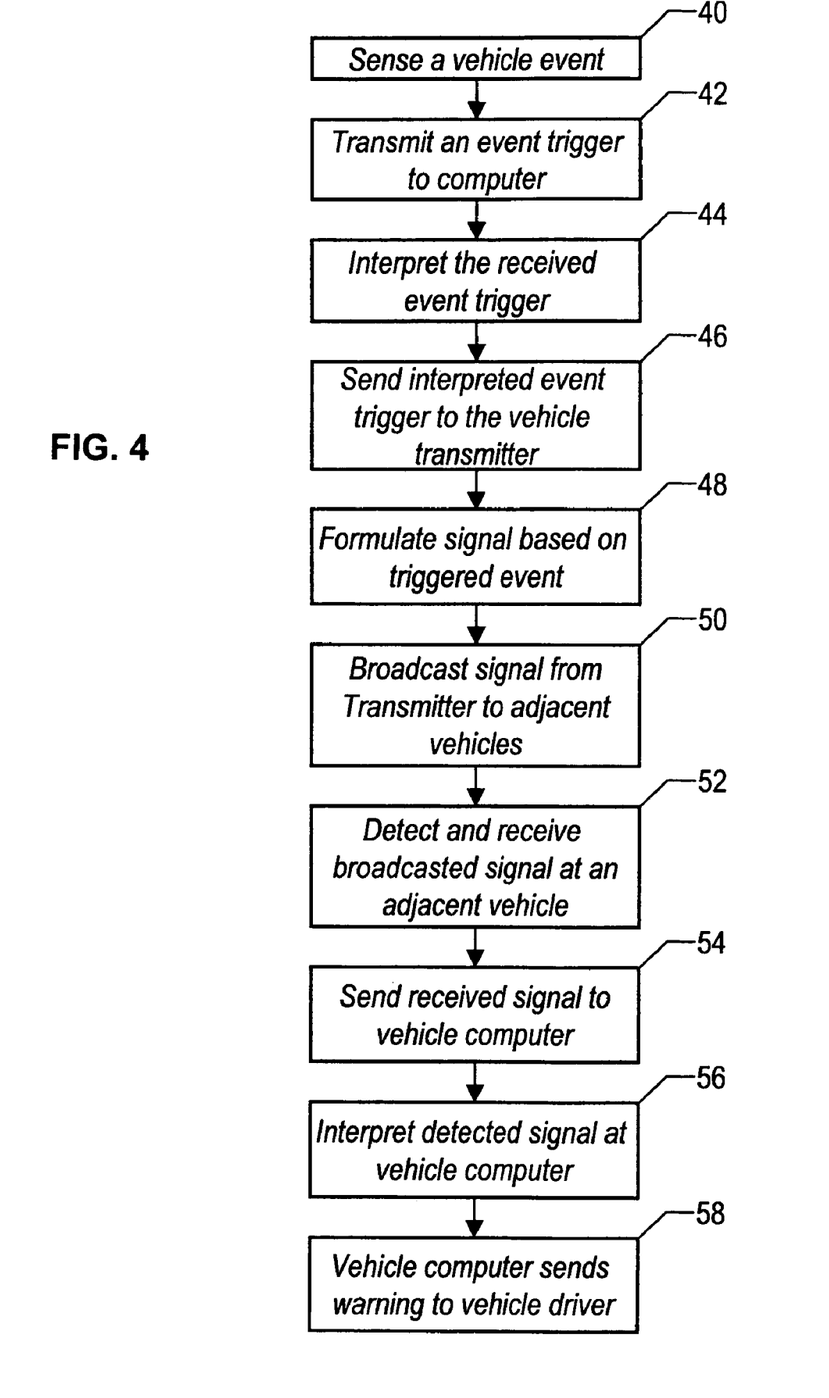
FIG. 4 is a detailed flow diagram of the steps in the implementation of the method of the present invention.

FIG. 4 is a more detailed flow diagram of the steps in the implementation of the method of the present invention. As with the method of FIG. 3, the sensors and computing device are in an initial monitoring mode. When an event occurs, sensors detect the event in step 40. The sensors transmit an event trigger signal to the computing device in step 42. Once the computing device receives the signal, in step 44, the computing device interprets the signal. This interpretation is to determine the type of detected event in order to accurately inform the other vehicles of the type of situation of that exist with the vehicle submitting the message. The determination of the type of detected event could be a function of the particular sensor that transmitted the event to the computer. As previously mentioned, there can be several types of sensors in the vehicle. The multiple types of sensors can provide the capability to detect various types of vehicle events that can occur. In the above description of the sensor component, the accelerometer sensor, the speed sensor, the crash sensor and the peripheral sensor can all detect different types of events. Therefore depending of the particular sensor that is detecting the event and transmitting the signal, the computer can determine the type of trigger event.

Step 46 sends to interpreted trigger signal to the transmitter for transmission to the other vehicles in the grid. Prior to transmission, the message is formulated, in step 48, such that the recipient vehicle can readily interpret the message. The formulated message contains an identification of the vehicle that sent the message and the type of trigger event of the vehicle. It is important to identify the transmitting vehicle because in the implementation of this method, messages can be relayed from a car receiving a transmitted message to other vehicles in the grid. In this case, the receiving vehicle needs to know when a message is from the original vehicle or if the message is a relayed message. The formulated message can have various fields that contain the information. This message formulation step 46 can occur in the transmitter or it can occur in the computing device prior to submission of the message to the transmitter. Step 50 broadcast the message to the other vehicles in the grid. As mentioned, this broadcasting activity occurs in the transmitter device.

Step 52 is the message-receiving step that occurs in a vehicle in the grid that receives the transmitted message from the vehicle (the first vehicle) experiencing the event. Once the transmitted signal is received at the second vehicle, step 54 sends the signal to the computing device of the vehicle. In the computing device, step 56 processes the message and interprets the message. In the interpretation, the computing device identifies the vehicle that initially sent the message and also determines the type of event detected at the first vehicle. Reading the information in a particular field of the message can perform the identification process. Once there has been an interpretation of the message, in step 58, the computer conveys the message to the driver of the second vehicle. As mentioned, this conveyance can be via a display on the dashboard of the vehicle.

Figure 5:
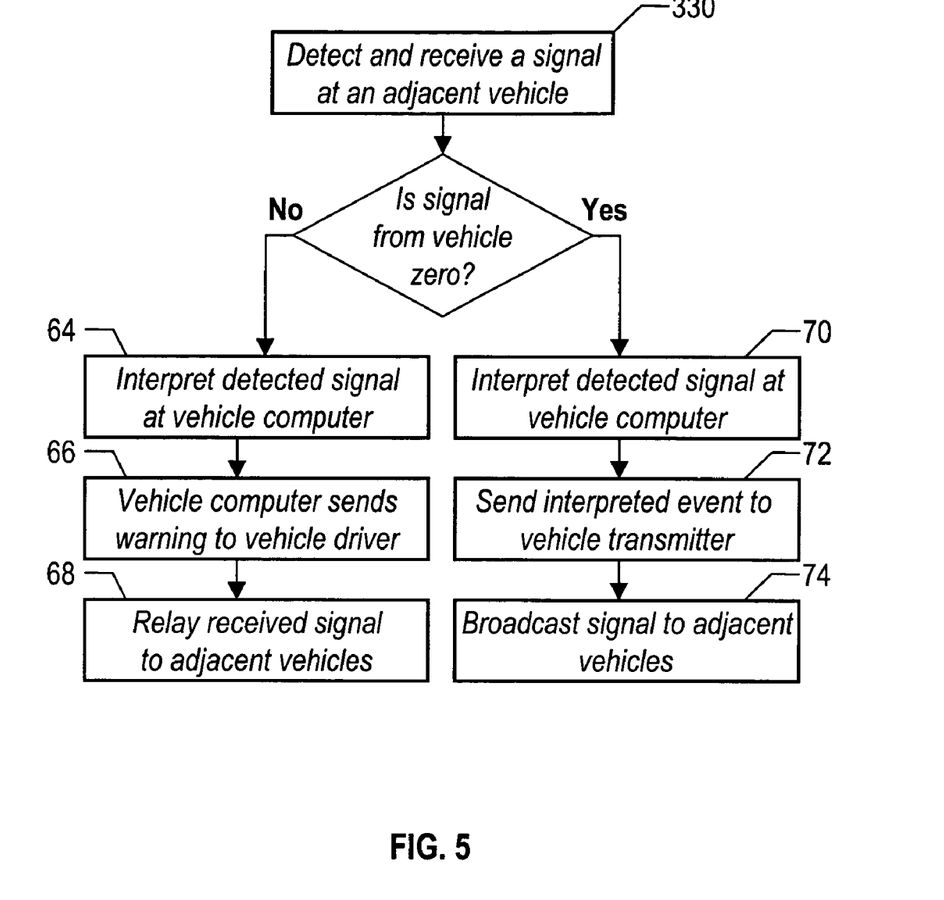
FIG. 5 is a flow diagram of the steps in an alternate implementation of the method of the present invention.

FIG. 5 is a flow diagram of the steps in an alternate implementation of the method of the present invention. In this alternate method, the computer receives an input signal in step 60. This step is the same as step 44 of FIG. 4. Because the computing device receives inputs from two different sources (the sensors and the receiver), it is necessary to make a determination of the source of the input signal. This signal source determination occurs in step 62. The determination could be from a field in the formatted message indicating that the message is from another vehicle. In addition, the determination could be from the fact that the signal is directly from a vehicle sensor. The vehicle sensor signal could have a different format from the signal of the receiver device.

If the determination in step 62 is that the detected signal is from the receiver, then the determination of the computing device is that the signal is from another vehicle. In this case, the process moves to step 64, which interprets the signal similar to step 56 of FIG. 4. In step 66, the computing device processes the signal and sends a warning to the vehicle driver. After the driver has received the warning, step 68 relays the warning to other vehicles in the range of the relaying vehicle. The process for relaying the vehicle signal is the same as if the signal originated at the vehicle. However, the relayed message would be formatted to contain a field that identifies the message sender as relaying vehicle and not the vehicle that originated the message.

Referring back to step 62, if the determination is that the message is from a sensor, then the determination is that the signal is from vehicle zero (the vehicle containing the sensors and the computer). With this route, the process is similar to process that begins with step 42 of FIG. 4. Step 70 interprets the computer and formats a message for transmission. Step 72 then sends this signal to the message transmitter. As previously mentioned, the message formatting can also occur at the transmitter as well as the computer device. Step 74 then broadcasts the signal to other vehicles in the vehicle grid in a manner similar to step 50.

The following diagram shows a piece of a dynamic car grid. The examples used the configuration of the three-car grid shown in FIG. 1 to illustrate the operations of the present invention. As previously described, FIG. 1 shows three cars equipped with the necessary components (sensors, transmitter and receiver) necessary to become a resource in the dynamic vehicle grid. The diagram shows the range of the ability of each vehicle to transmit and receive information. There is no single control point for the vehicle grid. Each vehicle is able to transmit information to any other vehicle as long as it falls within the bounds of the transmit range.

The following set of process steps show how the vehicle grid can be used to signal to cars that an emergency brake has occurred.

1) The driver of a car 1 suddenly sees a problem in the road ahead and applies the brakes very hard.

2) The accelerometer sensor of car 1 detects emergency braking and feeds the information to the central computer.

3) The computer receives the information and understands that a local sensor was triggered. The computer interprets this as 'distance 0'—i.e., the local car. The computer then triggers the transmitter to signal other vehicles in the area. Car 1 transmits information:

"Car Distance 0 Is Emergency Braking"

4) Car 2 is in range of car 1. Car 2 receives the information and passes this information to the central computer.

5) Car 2 central computer detects that a car in the car in the immediate area has triggered an emergency braking. Because the information contained in the message says 'distance 0', Car 2 knows that the emergency braking car is only 1 car away.

6) The computer now optionally warns the driver that the car in front is braking by a plurality of methods not limited to:

Flashing the message on the dashboard

Using a Head Up Display

Audio Warning

7) The computer of a car 2 may also apply the brakes or reduce fuel flow to decrease speed.

8) The computer of a car 2 then relays the same information to any vehicle in its range, but adding one to the distance:

"Car Distance 1 Is Emergency Braking"

9) Car 3 is in range of car 3. Car 3 receives the information and passes this information to the central computer.

10) Car 3 central computer detects that a car 1 hop away from its range triggered an emergency braking. Because the information contained in the message says 'distance 1', Car 3 knows that the emergency braking car is 2 cars away.

11) The computer now optionally warns the driver that the car 2 cars in front is braking by a plurality of methods not limited to Flashing the message on the dashboard
Using a Head Up Display
Audio Warning 12) The computer of car 3 may also apply the brakes—but this time maybe not as much as car 2.

13) The computer of car 3 then relays the same information to any vehicle in its range, but adding one to the distance:

"Car Distance 2 Is Emergency Braking"

14) The process is repeated until a pre determined number of hops has been reached.

The process is not indicative the novelty of this disclosure unto itself. The inventors agree that there exist a plurality of possible scenarios where this invention could be utilized to transmit a plurality of alert and notification methods. A similar process can be followed to warn surrounding vehicles of other hazards including vehicle that:

are slow or stopped in traffic for a period of time;
have had an air bag deployed;
have swerved suddenly; and
have switched on their windshield wipers, lights or other such peripheral equipment in response to external alertable conditions.

The problem therefore solved by the present invention is that potentially dangerous situations can be instantly propagated between vehicles to increase the safety of our road systems and reduce the likelihood of an accident. In the current art, an emergency braking is most likely only seen by the vehicle immediately behind. This invention allows vehicles many cars behind to instantly know that there is a problem such that the driver may apply the brakes in good time.

The invention also solves the problem of identified slow or stopped traffic such that a driver can take a different route. The vehicle grid does not need any ground infrastructure or set of processes or procedures to function so therefore it is much cheaper to install and operate. It also provides instantaneous information to drivers of important situations (for example, the car 5 away from me has just emergency braked). Known solutions cannot provide this immediate level of alerting.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method for enabling motor vehicles in a dynamic vehicle grid system to sense and respond to traffic conditions comprising the steps of:

detecting a vehicle event at a first vehicle in a vehicle grid system;
formulating a warning message at the first vehicle in response to the detected vehicle event, by identifying the vehicle event detected; and creating a message format indicating the detected event and the identity of the vehicle;
broadcasting the formulated warning message to other vehicles in the dynamic vehicle grid;
detecting the warning message at a first receiving vehicle in the dynamic grid;
determining whether the detected warning message is from a first vehicle or a receiving vehicle:
when the determination is that the detected warning message is not from a first vehicle, interpreting the detected warning message at the receiving vehicle and sending the detected warning message to a driver of the receiving vehicle;
formulating a relay message at the receiving vehicle containing information from the warning message detected at the receiver vehicle, the relay message containing a field that identifies a sender of the relay message as a relay message sender and not the first vehicle which sent the original warning message;
relaying the formulated relay message to other vehicles in close proximity to the receiving vehicle that formulated the relay message; and
repeating said relay message formulating step and said message relaying step at receiving vehicles that received the relay message.

2. The method as described in claim 1 wherein said message formulating step further comprises the steps of: interpreting the message, which.

3. The method as described in claim 2 wherein the formulated message is broadcast from a computing device.

4. The method as described in claim 2 wherein the formulated message is broadcast from a transmitter device.

5. The method as described in claim 2 wherein the generated warning at the a receiving vehicle is conveyed to the driver of the receiving vehicle via a display in the receiving vehicle.

6. A computer program product stored in a computer readable storage medium for enabling motor vehicles in a dynamic vehicle grid system to sense and respond to traffic conditions comprising:

instructions detecting a vehicle event at a first vehicle in a vehicle grid system;
instructions formulating a warning message at the first vehicle in response to the detected vehicle event, by identifying the vehicle event detected; and creating a message format indicating the detected event and the identity of the vehicle;
instructions broadcasting the formulated warning message to other vehicles in the dynamic vehicle grid;
instructions detecting the warning message at a first receiving vehicle in the dynamic grid:
instructions determining whether the detected warning message is from a first vehicle or a receiving vehicle:
when the determination is that the detected warning message is not from a first vehicle, instructions interpreting the detected warning message at the receiving vehicle and sending the detected warning message to a driver of the receiving vehicle;
instructions formulating a relay message at the receiving vehicle containing information from the warning message detected at the receiver vehicle, the relay message containing a field that identifies a sender of the relay message as a relay message sender and not the first vehicle which sent the original warning message;
instructions relaying the formulated relay message to other vehicles in close proximity to the receiving vehicle that formulated the relay message; and instructions repeating said relay message formulating instructions and said message relaying instructions at receiving vehicles that received the relay message.

7. The computer program product as described in claim 6 further comprising instructions for conveying a generated warning at the receiving vehicle to the driver of the receiving vehicle via a display in the receiving vehicle.

8. A method for enabling motor vehicles in a dynamic vehicle grid system to sense and respond to traffic conditions comprising the steps of:

detecting a vehicle event at a first vehicle in a vehicle grid system;

determining whether the detected event is from the first vehicle;

interpreting the detected event at the first vehicle;

formulating a warning message at the first vehicle in response to the detected vehicle event, by identifying the vehicle event detected; and creating a message format indicating the detected event, the identity of the vehicle and identifying in a field contained in the message information that identifies a sender of the message as the first vehicle;

broadcasting the formulated warning message to other vehicles in the dynamic vehicle grid;

detecting the warning message at a first receiving vehicle in the dynamic grid;

determining whether the detected warning message is from a first vehicle or a receiving vehicle;

when the determination is that the detected warning message is from the first vehicle, interpreting the detected warning message at the receiving vehicle and sending the detected warning message to a driver of the receiving vehicle;

formulating a relay message at the receiving vehicle containing information from the warning message detected at the receiver vehicle, the relay message containing a field that identifies a sender of the relay message as the first vehicle which sent the original warning message;

relaying the formulated relay message to other vehicles in close proximity to the receiving vehicle that formulated the relay message; and repeating said relay message formulating step and said message relaying step at receiving vehicles that received the relay message.

\* \* \* \* \*